US008585459B2

(12) United States Patent
Martinet et al.

(10) Patent No.: US 8,585,459 B2
(45) Date of Patent: Nov. 19, 2013

(54) BRASSIERE CUPS INCORPORATING PADDED UNDERWIRE ASSEMBLIES AND A METHOD OF MAKING THE SAME

(75) Inventors: Nathalie Madeleine Martinet, Clearwater Bay (HK); Kwan Yin Yip, Hong Kong (HK)

(73) Assignee: Victoria's Secret Store Brand Mangement, Inc., Reynoldsburg, OH (US)

( * ) Notice: Subject to any disclaimer, the term of this patent is extended or adjusted under 35 U.S.C. 154(b) by 304 days.

(21) Appl. No.: 12/932,619

(22) Filed: Mar. 1, 2011

(65) Prior Publication Data
US 2012/0225607 A1 Sep. 6, 2012

(51) Int. Cl.
*A41C 3/00* (2006.01)
(52) U.S. Cl.
USPC ................................ 450/41; 450/52; 450/58
(58) Field of Classification Search
USPC .................. 450/41, 52, 38; 2/257, 260.1, 264
See application file for complete search history.

(56) References Cited

U.S. PATENT DOCUMENTS

| 3,209,756 A * | 10/1965 | Rowell ............................. 450/52 |
| 3,605,753 A | 9/1971 | Schwartz |
| 4,133,316 A | 1/1979 | Schwartz |
| 4,203,449 A | 5/1980 | Winzelberg |
| 4,271,580 A | 6/1981 | King et al. |
| 4,275,740 A | 6/1981 | Weston |
| 4,777,668 A | 10/1988 | Weston |
| 5,141,470 A | 8/1992 | Morgan et al. |
| 5,730,641 A * | 3/1998 | Brown ............................. 450/41 |
| 5,749,767 A | 5/1998 | Arceo |
| 5,830,040 A | 11/1998 | Morgan et al. |
| 5,934,970 A | 8/1999 | Morgan et al. |
| 6,152,802 A | 11/2000 | Horta et al. |
| 6,435,939 B1 | 8/2002 | Lin |
| 6,468,130 B1 | 10/2002 | Thakur et al. |
| 6,682,395 B2 | 1/2004 | Falla et al. |
| 6,780,080 B2 | 8/2004 | Horta et al. |
| 6,805,610 B2 | 10/2004 | Luk |
| 6,857,934 B2 | 2/2005 | Chan |
| 6,896,580 B2 | 5/2005 | Falla et al. |

(Continued)

FOREIGN PATENT DOCUMENTS

| CN | 2240871 Y | 11/1996 |
| CN | 2798626 Y | 7/2006 |
| JP | 11-158707 A | 6/1999 |

OTHER PUBLICATIONS

International Search Report and Written Opinion of the International Searching Authority mailed Feb. 21, 2012.

(Continued)

*Primary Examiner* — Gloria Hale
(74) *Attorney, Agent, or Firm* — Andrus, Sceales, Starke & Sawall, LLP

(57) ABSTRACT

Brassiere cups, each comprising an inner layer attached to an outer layer. The inner layer comprises an inner foam material that is substantially laminated to an inner fabric lining. The outer layer comprises an outer foam material that is substantially laminated to an outer fabric lining. Each brassiere cup further includes an underwire assembly having an arcuate wire coupled to a plurality of gel pads. The underwire assembly is housed between the inner foam material and the outer foam material at or adjacent to a lower peripheral area of each brassiere cup. Preferably, each of the gel pads is coupled to respective ends of the arcuate portion.

41 Claims, 11 Drawing Sheets

(56) References Cited

U.S. PATENT DOCUMENTS

| | | |
|---|---|---|
| 7,189,138 B1 | 3/2007 | Utaka |
| 7,192,332 B2 | 3/2007 | Liu |
| 7,207,861 B2 | 4/2007 | Martini |
| 7,234,994 B2 | 6/2007 | Fildan et al. |
| 7,309,275 B1 | 12/2007 | Morales |
| 7,407,428 B2 | 8/2008 | Fildan et al. |
| 7,497,760 B2 | 3/2009 | Redenius |
| 7,563,152 B2 | 7/2009 | Liu |
| 7,666,060 B2 | 2/2010 | Cheung |
| 2002/0098775 A1 | 7/2002 | Avellanet |
| 2004/0142633 A1* | 7/2004 | Luk ............ 450/39 |
| 2006/0111016 A1* | 5/2006 | Davis ............ 450/1 |
| 2007/0004315 A1 | 1/2007 | Luk et al. |
| 2008/0076326 A1 | 3/2008 | Wan |
| 2008/0090491 A1 | 4/2008 | Liu |
| 2009/0156096 A1 | 6/2009 | Horta et al. |

OTHER PUBLICATIONS

Office Action issued dated Mar. 28, 2013 for Canadian Patent Application No. 2,740,100.

* cited by examiner

BRASSIERE CUPS INCORPORATING PADDED UNDERWIRE ASSEMBLIES AND A METHOD OF MAKING THE SAME

FIELD OF THE INVENTION

The present invention relates to brassiere cups, and more particularly, to brassiere cups incorporating padded underwire assemblies having gel pads and a method of making the same.

BACKGROUND OF THE INVENTION

Brassieres (commonly known as bras) are undergarments for covering, restraining, shaping, and elevating the wearer's breasts. Brassieres are designed for specific body types, fashions, and activities. Common brassiere styles include full-coverage, push-up, padded, demi cup, plunge, multi-way, strapless, racerback, backless, and front closure. Regardless of the styles and types, brassieres often contain cups with underwires for added effects of shaping, lifting, and supporting the breasts. In some instances, brassiere cups are integrally attached to garments, such as tank tops, shirts, dresses, or bathing suits.

Typically, the underwires in brassiere cups extend partially or entirely along the lower periphery of the cups and are positioned in a sleeve disposed about the lower periphery of each brassiere cup. In more modern brassieres, underwires are molded between layers of brassiere cup materials. Underwires are generally formed of thin lengths of a fairly rigid material, such as metal or polymeric material, having a rectangular or rounded cross-section. The rigidity of the underwire material is essential for lifting and holding the breasts in place. At the same time, the materials must be flexible enough to curve along the bottom contour of the breasts, which is a generally a widened U-shape.

While underwires have achieved widespread usage, certain disadvantages result from their use. During the use of a brassiere, or other supporting garments containing underwires, the underwires apply pressure to the wearer along the lower periphery of the brassiere cups. Notably, the ends or tips of the underwires create the greatest pressure on the wearer. Such pressure points are located at areas on both sides of the breasts proximate the wearer's armpits and areas in between the cleavage portion of the breasts. The pressure results in rubbing or pinching of the skin—rendering prolonged use of the brassiere uncomfortable or even painful. In a more serious case, the underwire tips could tear through the brassiere materials and partially expose the underwire as a result. If the exposed underwire tips are hard or sharp, they could scrape or puncture the clothing or skin of the wearer. Even if no such damages occur, the exposed underwire could cause skin irritation to some wearers due to an allergic reaction, especially when the underwire is made of metal.

Furthermore, the discomfort or pain accompanying the use of underwires in brassieres often causes the wearer's movement to be restricted. In fact, some wearers preemptively limit their movements in order to lower their level of discomfort or chances of getting injured. This defeats the purpose of wearing a brassiere, because brassieres replaced corsets as a means to free women from constricting garments.

A common practice for alleviating discomfort from brassiere underwires is to provide a cushion along the entire length of the underwire. Such cushions are often made of a soft foam, cotton, or layers of fabric. Although this solution helps to reduce the overall pressure, it does not effectively balance the uneven pressure created by the underwire tips. Moreover, the bulkiness of the cushion creates a space between the wearer's breasts and the brassiere—rendering the brassiere more prone to being displaced with movements of the wearer. The cushions may also cause brassiere to appear heavier and bulkier, which may interfere with fashionable outer garments. Therefore, such wearability problems are undesirable, both from practical and aesthetic perspectives.

Another solution to the problem accompanying the use of underwires is in a form of underwire end protectors. For example, a cushion tip made of a relatively soft material, such as plastic, can be attached at each end of the underwire. However, this solution too encounters problems. Since the end protectors are softer and more fragile than the underwire, there comes a point where the end protector breaks. This occurs when the brassiere is subjected to repeated use and wear created by the movement of the wearer. When the end protector reaches its stress threshold, it breaks and exposes a portion of the metal underwire. Some manufacturers have tried to solve this problem by completely encapsulating the underwire with more material such as rubber or foam. Again, the added materials cause displacement of the brassieres or undesirable bulkiness, resulting in wearability problems.

There is therefore a need for underwire brassiere cups that overcomes some or all of the previously delineated drawbacks of prior underwire brassieres. Particularly, there is a need for underwire brassiere cups that minimize wearability problems and painful pressure points on the body of the wearer, while also providing support and rigidity to the wearer.

SUMMARY OF THE INVENTION

An object of the invention is to overcome the drawbacks of previous inventions.

Another object of the invention is to provide novel and useful brassiere cups having gel tips that increase the comfort and wearability to the user.

Another object of the invention is to provide novel and useful brassiere cups having gel tips that are formed into desired shapes.

Another object of the invention is to provide underwire gel tips for reducing the pressure associated with the tips of the underwire on the body of the user.

Another object of the invention is to provide novel and useful underwire assembly comprising an underwire and gel pads coupled thereto.

In one embodiment, a brassiere cup for protecting a wearer is provided, which includes gel tips. Gel tips are protrusions formed by placing at least one gel pad between inner and outer layers of materials. Preferably, the inner layer includes at least one shaved gel area to house the at least one gel pad. The gel tips are strategically placed on the brassiere to alleviate pressure points created by the brassiere.

In another embodiment, an underwire assembly is provided comprising an underwire having an arcuate wire coupled to at least one gel pad. Preferably, the arcuate wire is housed in a wire casing before the at least one gel pad is attached. Optionally, the tips of the arcuate wire may be covered with protective paint or caps known in the art before it is housed in the wire casing. The at least one gel pad is preferably attached to either end of the arcuate wire. But the gel pad may be attached anywhere along the length of the arcuate wire and need not cover the entire length of the arcuate wire. Most preferably, at least one gel pad is attached to each end of the arcuate wire on a surface that faces the body of the wearer and each end of the arcuate wire roughly corresponds with the center of the at least one gel pad. The underwire assembly is then incorporated into a brassiere.

In another embodiment, a protective brassiere cup is provided comprising an underwire assembly and an inner layer attached to an outer layer. The inner layer comprises an inner foam material that is substantially laminated to an inner fabric lining. The outer layer comprises an outer foam material that is substantially laminated to an outer fabric lining. The underwire assembly has an arcuate portion coupled to at least two gel pads. Each of the gel pads are coupled, to respective ends of the arcuate portion. The underwire assembly is preferably housed between the two foam layers at around a lower peripheral area of each brassiere cup.

The properties of the material used to make the gel pads allow the gel pads to absorb and redistribute the pressure from the underwires. Thus, the gel pads according to the present invention balance the uneven pressure exerted by brassiere cup or underwires by providing maximum support and cushioning effect. As a result, the wearer is able to enjoy the benefits of a brassiere, including an underwire brassiere, without the fear, discomfort and/or pain associated with it.

BRIEF DESCRIPTION OF THE DRAWINGS

A further understanding of the present invention can be obtained by reference to preferred embodiments set forth in the illustrations of the accompanying drawings. Although the illustrated embodiments are merely exemplary of systems and methods for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE INVENTION

The present invention may be understood more readily by reference to the following detailed description of preferred embodiments of the invention. However, techniques, systems and operating structures in accordance with the present invention may be embodied in a wide variety of forms and modes, some of which may be quite different from those in the disclosed embodiments. Consequently, the specific structural and functional details disclosed herein are merely representative, yet in that regard, they are deemed to afford the best embodiments for purposes of disclosure and to provide a basis for the claims herein, which define the scope of the present invention. It must be noted that, as used in the specification and the appended claims, the singular forms "a", "an", and "the" include plural referents unless the context clearly indicates otherwise. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used herein, a "brassiere" refers not only to an undergarment, but also an integral piece of a garment to support and give contour to the breasts. Examples of such garments include, but are not limited to, shirts, tank tops, camisoles, other conventional tops, dresses, leotards, sportswear, bathing suits, and the like.

As used herein, the term "inner layer" of a brassiere refers to the layer that adjoins the body when a wearer wears the brassiere. Accordingly, the term "outer layer" refers to the layer that is further away from the body of the wearer.

As used herein, the term "back side" of a brassiere refers to the side of the brassiere that immediately adjoins the body when a wearer wears the brassiere. Accordingly, the term "front side" of a brassiere refers to the side which is opposite the back side and faces away from the wearer.

Figure 1A:
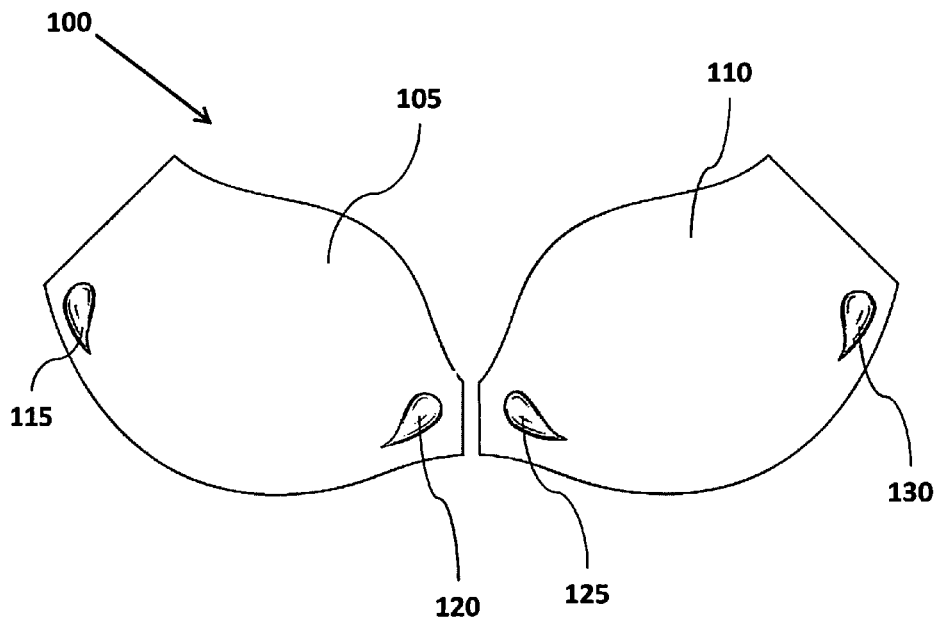
FIG. 1A is a back view of a brassiere cup assembly having the gel tips according to the preferred embodiment of the invention.

Referring initially to FIG. 1A, there is shown a back side of a brassiere cup assembly 100. According to a preferred embodiment of the invention, the brassiere cup assembly 100 includes two brassiere cups 105 and 110 having an underwire assembly (hidden) placed between inner and outer layers of each brassiere cup, with the inner layer being closer to the wearer. Optionally, additional layer(s) and/or padding material may be present between the inner and outer layers.

Preferably, each of brassiere cups 105 and 110 bears novel gel tips, 115, 120, 125, and 130. The gel tips according to the present invention balance the uneven pressure applied by a brassiere by providing support and cushioning effect at pressure points created by the brassiere underwire. The gel tips 115 and 120 comprise gel pads that are integrally attached to an arcuate wire, which is placed between the inner and outer layers. Similarly, gel tips 125 and 130 include integrally placed gel pads on an arcuate wire of the brassiere cup 110. Since gel tips 115, 120, 125, and 130 do not cover the entire length of the underwire, the brassiere cups 105 and 110 sit closer to the body of the wearer. Therefore, the gel tips according to the present invention minimize the chances of the brassiere cups being displaced. Furthermore, while providing cushion, the less bulky appearance of the brassiere cups of the present invention allows the brassiere cups to be worn under many fashionable outer garments. It must be noted that although FIG. 1A shows a preferred embodiment with four gel tips 115, 120 125, and 130 placed at locations corresponding to all four ends of the arcuate wire, not all ends of the arcuate wire need to have a gel tip. Thus, it is conceivable that only one end of the underwire has a gel tip according to the present invention. Moreover, it should be appreciated that gel tips may be placed on other parts of the underwire and/or other parts of the brassiere to minimize pressure points from the brassiere.

Figure 1B:
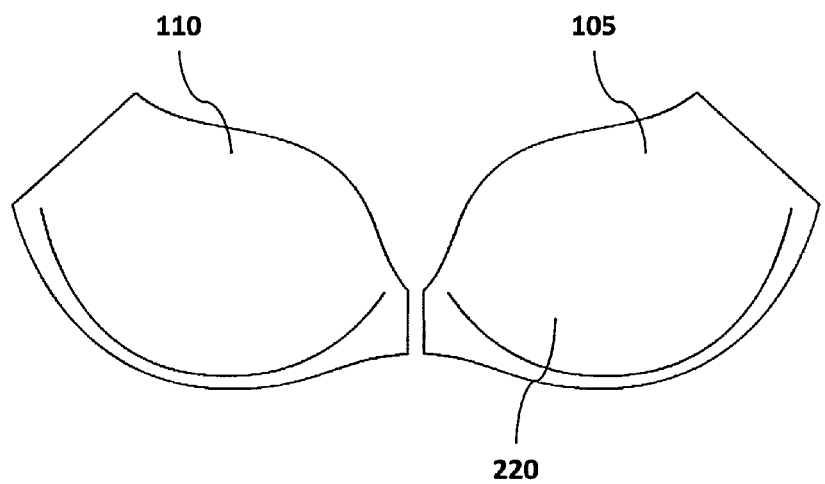
FIG. 1B is a front view of the brassiere cup assembly according to the preferred embodiment of the invention.
Figure 11:
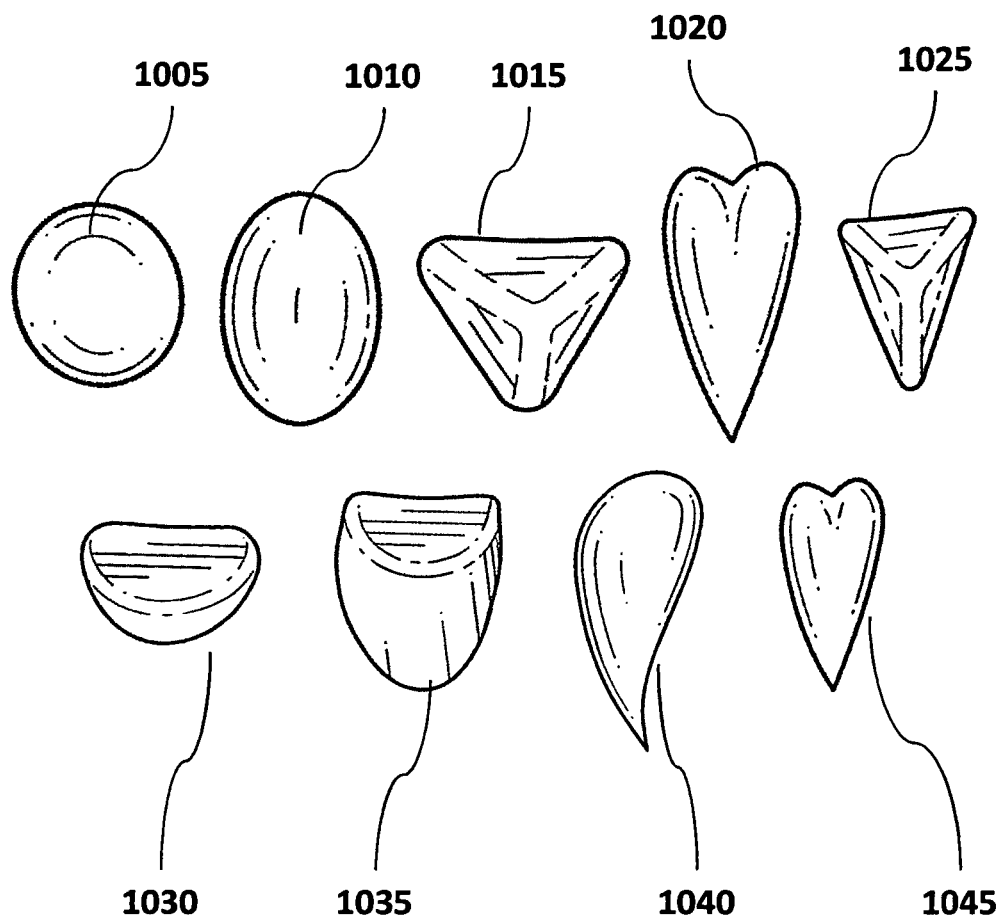
FIG. 11 is a perspective view of several shapes for the gel tips according to alternate embodiments of the invention.

Preferably, the gel pads are not visible from the back side of the brassiere as they are covered by the inner layer. However, the volume of gel pads may cause the formation of protruded gel tips on the surface of a brassiere cup. Alternatively, gel tips may be flat with respect to the surface of the inner layer of the brassiere cups 105 and 110. According to a preferred embodiment of the invention, gel tips protrude from the back side of the brassiere cups toward the wearer to create cushion-like bumps. More preferably, the protruding gel tips have predetermined shapes formed through molding process as described below. It is noted that although gel tips 115, 120, 125, and 130 bear a tear-drop shape in FIG. 1A, it is contemplated that gel tips, independently of one another, may utilized different shapes. Nonlimiting examples of various shapes for the gel tips are shown in FIG. 11, which is discussed in detail below. On the other hand, the front side of the brassiere cups 105 and 110 is preferably smooth and bears no apparent bumps from the gel pads as illustrated in FIG. 1B.

Referring to FIGS. 2-9, there is shown a method of constructing brassiere cup assembly 100 by utilizing various assemblies of layers and underwires according to a preferred embodiment of the invention.

Figure 2A:
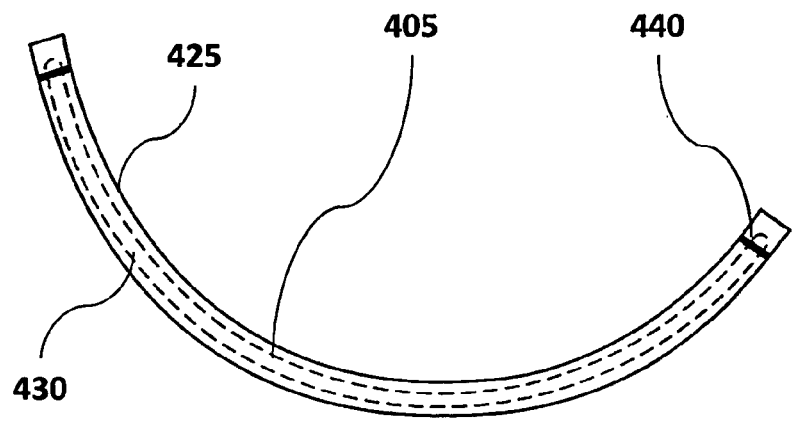
FIG. 2A is a plan view of an underwire arcuate portion housed in a wire casing in accordance with an embodiment of the invention.

Referring to FIG. 2A, an underwire comprising an arcuate wire 405 (shown as hidden) contained inside a wire casing 425 is provided. It should be appreciated that it is not necessary for the wire casing 425 to completely cover the arcuate wire 405. The wire casing 425 may cover only a portion of the arcuate wire 405 for additional protection for the wearer. The arcuate wire 405 may be made of any conventional material known in the art, including, but are not limited to, metal, polymeric material, and a mixture thereof. The arcuate wire 405 and/or the wire casing 425 generally has a flat cross-section such as oval or rectangular and includes a first side 430 and an opposing second side (not shown). However, it is also conceivable to use an arcuate wire having non-flat cross sections including, but not limited to, round, triangular, and other non-flat polygonal shapes. The arcuate wire could also have varying cross-sections and widths along its length. The tips of the arcuate wire 405 may be covered with protective paint, plastic caps, or any other material known in the art. According to a preferred embodiment, the arcuate portion 405 is inserted into a thin wire casing 425 and bar tacked 440 at both ends using a conventional method known in the art.

Figure 2B:
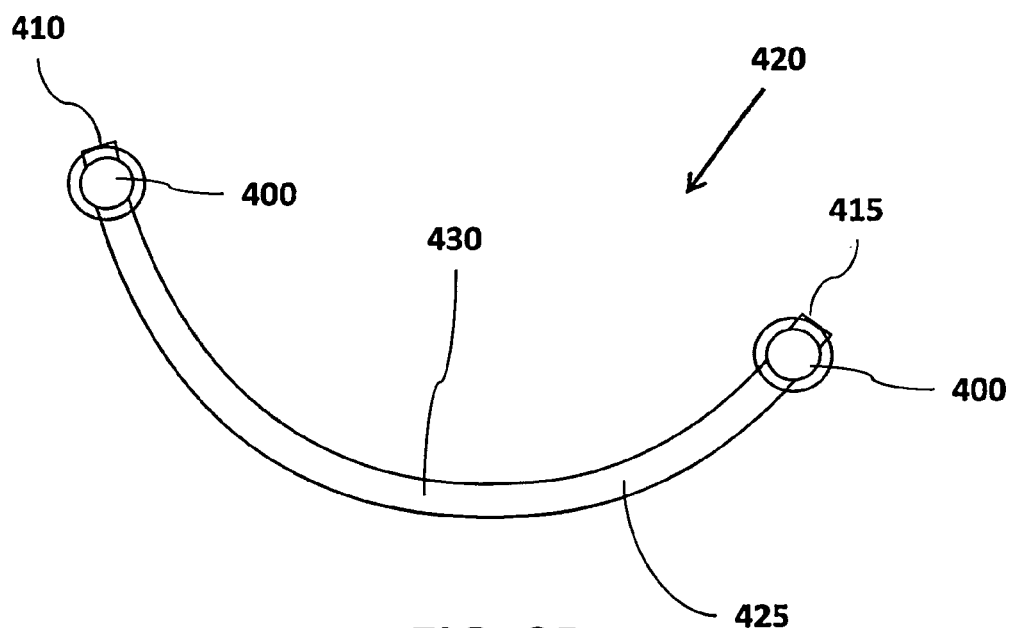
FIG. 2B is a plan view of an underwire assembly incorporated into the brassiere cup assembly of FIG. 1 according to an embodiment of the invention.

FIG. 2B illustrates an underwire assembly 420 which comprises an underwire as shown in FIG. 2A having gel pads 400 attached thereto according to a preferred embodiment of the present invention. The gel pad may be made of polyurethane gel, silicone gel, or the like. Preferably, the gel pad comprises a gel disc sandwiched between two polyurethane films. Specifically, the gel pad is made by first placing a first polyurethane film on a flat surface and then a relatively smaller gel disc on top of the film. A second polyurethane film, which is preferably about the same size as the first polyurethane film, is then placed on top of the gel disc. The edges of the polyurethane films are sealed by a heat nozzle or any other methods known in the art to envelop the polyurethane gel disc. The gel pad is created by trimming the excess films around the encased gel disc.

The gel disc is preferably made of polyurethane gel comprising styrene thermoplastic elastomer, tackifier, and phenolic antioxidant. Such polyurethane gel shows superior pressure redistribution capability compared to a general memory foam. The polyurethane gel is also thought to significantly buffer shearing force between the wearer and the brassiere inner layer, thereby rendering the prolonged use of the brassiere more comfortable compared to a conventional brassiere. The preferred polyurethane gel that may be utilized to make the gel pads according to the present invention is Exgel®, available from Kaji Corporation in Japan. Exgel® is an extremely flexible gel having both solid and liquid properties. Its shape can be easily distorted, but it always retains its original shape after a period of time. Moreover, Exgel® is resilient enough not be completely flattened out by an exerted force and maintains it functions. Exgel® also has an exceptional impact absorbing capability, which is 5 to 10 times greater than a general memory foam.

For assembling the underwire assembly 420, one side of the gel pad 400 is softened by applying heat thereto. The softened surface of the gel pad 400 attaches to the first side 430 of the wire casing 425 containing the arcuate wire 405. Preferably, each gel pad 400 is attached to each end 410 and 415 of the arcuate wire 405 and only partially covers the first side 430 of the arcuate wire 405. More preferably, the underwire assembly 420 comprises the gel pad 400 attached substantially to the first side 430 of the wire casing 425. If the arcuate wire 405 does not have a flat cross section, the side to which the gel pad 400 is attached is designated as the first side 430. Moreover, the center of the gel pad 400 roughly corresponds with either end 410 and 415 of the arcuate wire 405. This preferred placement of the gel pad 400 on either end 410 or 415 can be also seen in FIG. 10, where the end 410 of the arcuate wire 405 aligns with the center point C of the gel pad 400. In an alternative embodiment, two or more gel pads may be used for each end 410 and 415. Optionally, additional gel pads 400 may be attached to the first side of the arcuate wire 405 at a location in addition to ends 410 or 415. Preferably, the underwire assembly 420 is incorporated into a lower peripheral area of the brassiere cup.

Figure 3:
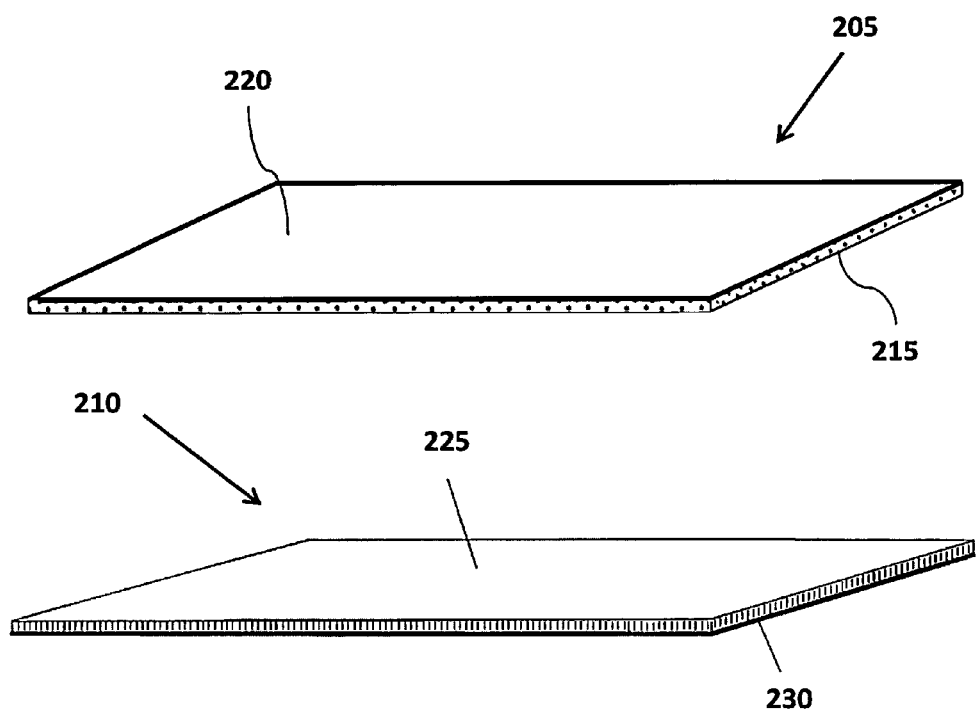
FIG. 3 is a perspective view of inner and outer layers of the brassiere cup assembly of FIG. 1 according to an embodiment of the invention.

As shown in FIG. 3, brassiere cup assembly 100 (FIG. 1) comprises at least the inner layer 210 and the outer layer 205. Preferably, the size of the outer layer 205 is about the same as that of the inner layer 210. Each layer preferably comprises a polyurethane foam Material attached to a fabric lining. However, it should be appreciated that either layer, independently of one another, may comprise a polyurethane foam material without the fabric lining. Furthermore, it is conceivable that either layer is made of one or more of other materials known in the art that are suitable for making brassiere cups. According to a preferred embodiment, outer layer 205 includes polyurethane foam material 215 laminated to a substantially coextensive outer fabric lining 220. Similarly, inner layer 210 preferably includes polyurethane foam material 225 laminated with a substantially coextensive fabric lining 230. The polyurethane foam materials 215 and 225 need not have a same chemical composition. Similarly, the fabric lining 220 and 230 need not be made of a same material.

In one non-limiting example, the polyurethane material 215 and 225 are laminated to each fabric lining 220 and 230, respectively, by loading a polyurethane foam roll and a fabric roll on a lamination machine. After glue is applied to one surface of the polyurethane foam roll, the fabric lining is bonded thereto by using a pressing roller. The lamination may preferably be rotary lamination. However, the surfaces may be laminated through spray lamination, powder lamination, hot melt lamination, or other methods of lamination known in the art.

Polyurethane foam materials 215 and 225 are formed through polymerization of at least one monomer containing hydroxyl groups and at least one monomer containing isocyanate functional groups. In another non-limiting embodiment, fiberfill made of polyester fiber may also be utilized to replace or supplement the polyurethane foam material. Fabric linings 220 and 230 may comprise 100% polyester interlock. Alternatively, fabric linings 220 and 230 may comprise, independently of one another, 100% nylon or synthetic and/or natural fiber with elastane, such as Spandex™, LYCRA®, ROICA®, CREORA®, Dorlastan™, Fujibo™ or similar types of materials.

Figure 4:
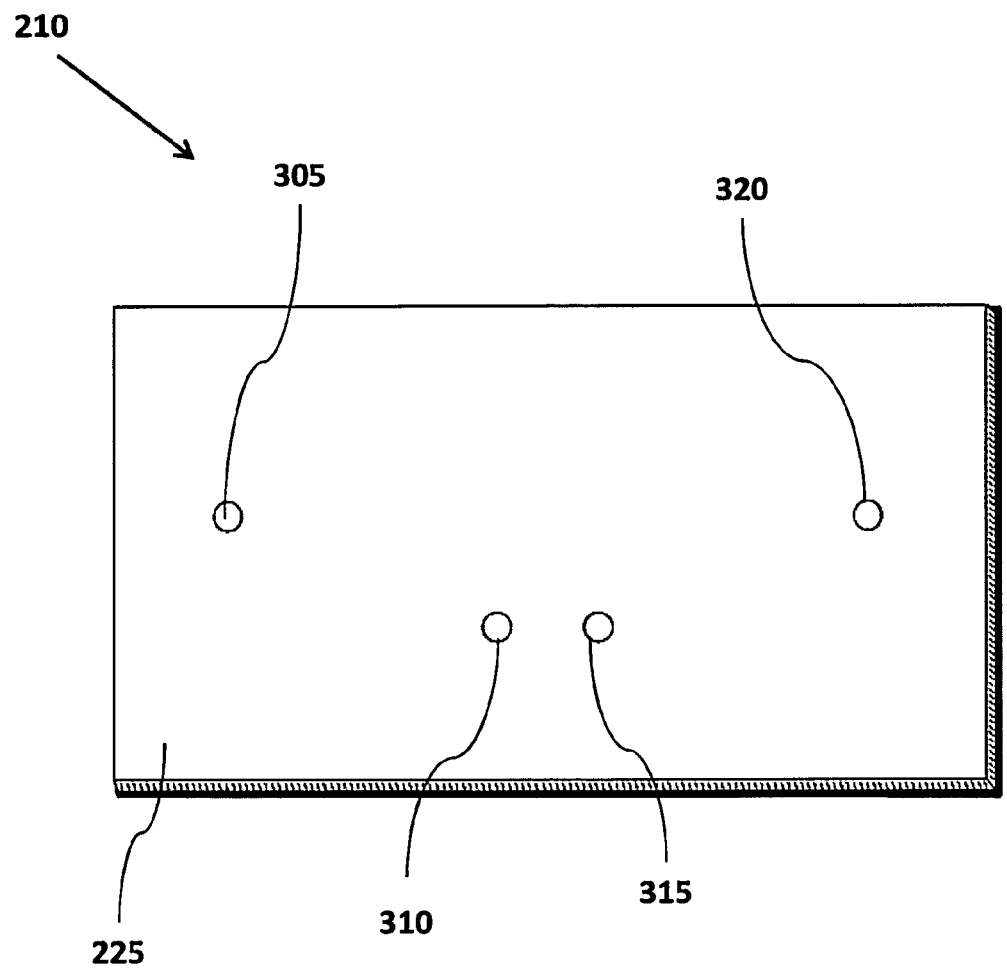
FIG. 4 is a perspective view of a foam material of the inner layer having shaved gel areas according to an embodiment of the invention.

As shown in FIG. 4, the inner layer 210 has the exposed polyurethane foam material 225 with four independent shaved gel areas 305, 310, 315, and 320. The shaved gel areas are created to accommodate the gel pads therewithin. In the finished brassiere cup assembly 100, each shaved gel area preferably corresponds to individual gel tips. Thus, it is also conceivable to have less than or more than four shaved gel areas, depending on the desired number of gel tips. Referring specifically to FIG. 4, each of the shaved gel areas 305, 310, 315, and 320 houses the corresponding gel pad 400 of the underwire assembly 420. Thus, one can see that the brassiere cup assembly 100 as shown in FIG. 1 bears the gel tip 115 corresponding with the shaved gel area 320, the gel tip 120 corresponding with the shaved gel area 315, the gel tip 125 corresponding with the shaved gel area 310, and the gel tip 130 corresponding with the shaved gel area 305.

The shaved gel areas preferably are shaven in a shape that roughly corresponds to the desired shape for the resulting gel tips. For example, if tear-dropped shaped gel tips as shown in FIG. 1A are desired, the corresponding shaved gel areas are shaved in oval or similar circular shapes instead of squared or rectangular shapes. The shaved gel areas may be created with a blade or shaving board having engraved predetermined shapes to partially remove polyurethane foam material. However, it should also be appreciated that other methods of shaving polyurethane foam material may be employed to create the shaved gel areas. Preferably, shaved gel areas are not visible from the fabric lining side 230 of the inner layer 210. Thus, the depth of shaved areas should not exceed the width of the polyurethane foam material 225. This is further illustrated in FIG. 10. Generally, the shaved gel areas, if they are roughly circular, have a diameter of about 15 mm and a depth of about 4 mm. However, other sized shaved areas may be utilized to accommodate larger or smaller gel pads.

Figure 5:
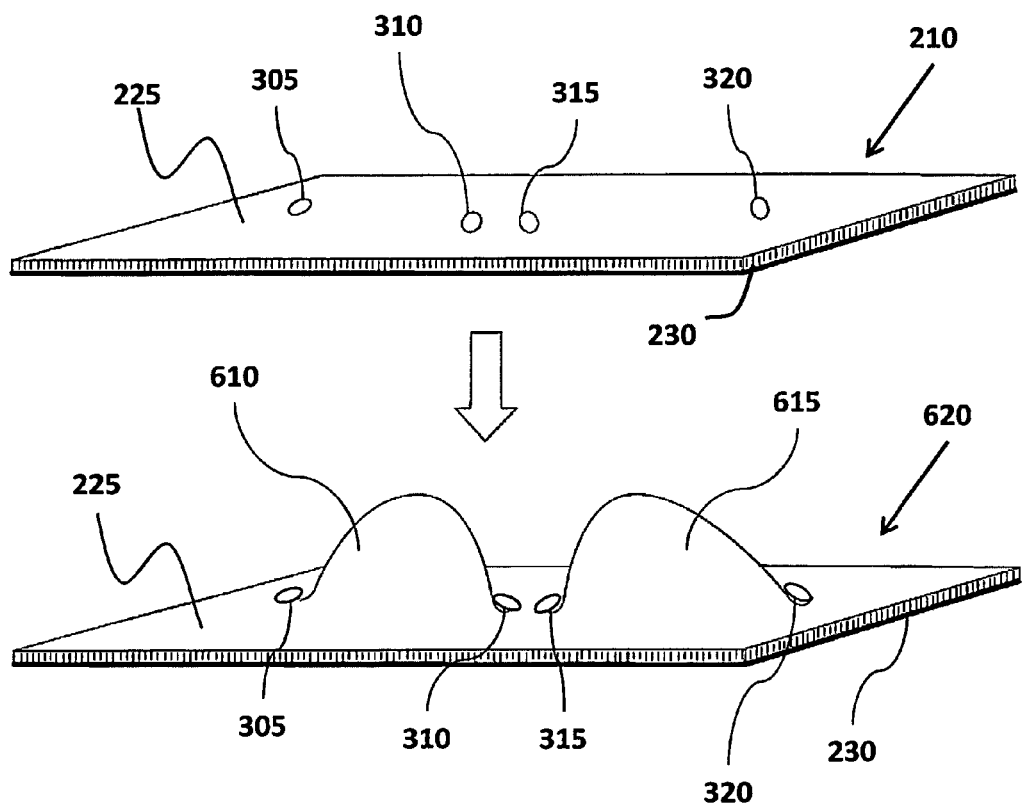
FIG. 5 is a perspective view of a first molding process of the inner layer according to an embodiment of the invention.

Referring now to FIG. 5, the inner layer 210 with shaved gel areas 305, 310, 315, and 320 is introduced into a first molding press (not shown) and molded to form a molded inner layer 620 having at least one brassiere cup portion 610 and 615. Preferably, the first molding press comprises a top molding panel and a bottom molding panel. The two panels are preferably preheated at designated temperatures and comprise aluminum, but other suitable material known in the art may be used to make the panels of the first molding press. The inner layer 210 is positioned into the molding press such that the polyurethane foam material 225 abuts the top molding panel having concave surfaces, and the fabric lining side 230 is positioned on the bottom molding panel having convex surfaces. Preferably, the top molding panel also contains bulged areas that fit inside the shaved gel areas. Moreover, the bulged areas have shapes that correspond to desired shapes for the resulting gel tips. The bottom molding panel preferably contains recessed areas, also in the shape desired for the resulting gel tips. For example, the top and bottom molding panels in FIG. 5 have corresponding bulged and recessed areas in tear-dropped shapes.

During the first molding process, the top and bottom molding panels sandwich the inner layer 210 such that the inner layer 210 becomes a molded inner layer 620 having brassiere cup portions 610 and 615, whose convex sides are on the same side as the shaved gel areas 305, 310, 315, and 320. The bulged areas of the top molding panel push the shaved gel areas 305, 310, 315, and 320 deeper into the inner layer 210 and form protrusions on the fabric lining side 230. The recessed areas of the bottom molding panel accommodate the formed protrusions. Notably, the forces applied simultaneously by both the bulged and recessed areas of the top and bottom molding panel, respectively, function to shape the protrusions into tear-drop shapes while the brassiere cup portions 610 and 615 are being formed. Each of the brassiere cup portions 610 and 615 would eventually become brassiere cups 110 and 105 (FIG. 1), respectively. It should be appreciated that various molding press' shape and depth can be utilized to define the shape of the resulting brassiere cups and/or their push-up levels. Furthermore, it is possible to adjust the dimensions of the inner layer and the design of the first molding press to create only one breast cup portion or more than one set of breast cup portions in one inner layer. Alternatively, one inner layer could contain a plurality of only one of brassiere cup portions 610 and 615, so as to obtain a plurality of only one of brassiere cups 110 and 105 (FIG. 1).

Figure 6:
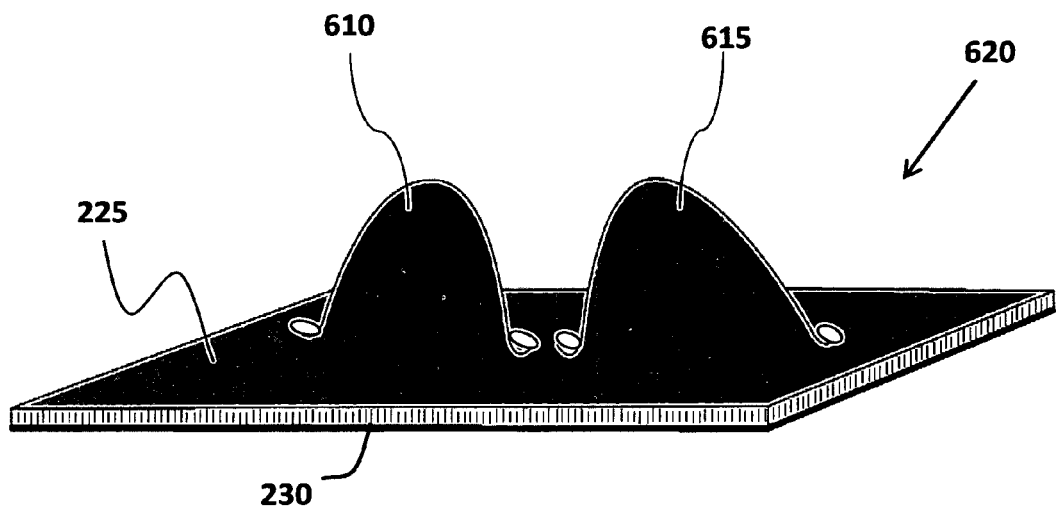
FIG. 6 is a perspective view of a molded inner layer with its foam material covered with glue according to an embodiment of the invention.

With reference to FIG. 6, after the three-dimensional brassiere cup portions 610 and 615 are formed, glue is sprayed or applied to the convex side (i.e., the side of polyurethane foam material 225) of the molded inner layer 620. Preferably, the glue is a solvent based glue and may be any one or more of water-based glue, thermal plastic glue, Thermoplastic Polyurethane (TPU) glue, Polyurethane (PU) glue, or the like.

Figure 7:
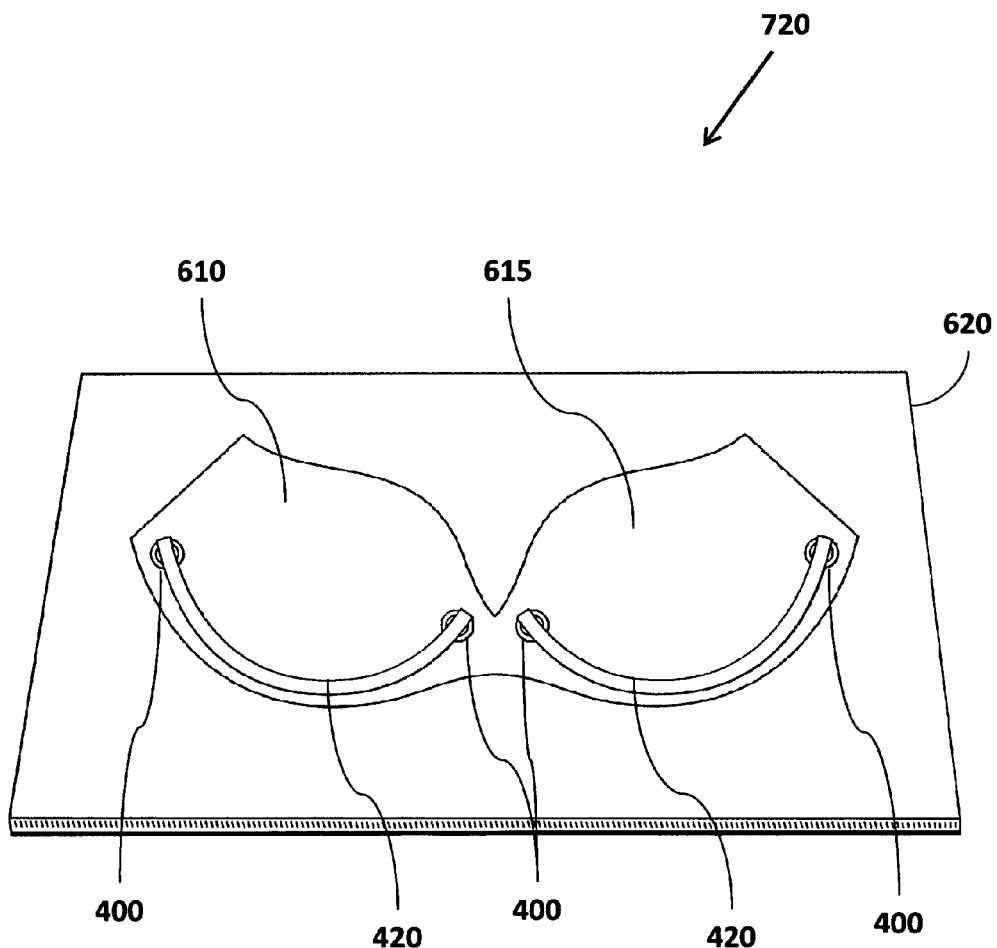
FIG. 7 is a perspective view of a composite inner layer comprising the underwire assembly shown in FIG. 2B according to an embodiment of the invention.

As shown in FIG. 7, two underwire assemblies 420 are placed on the glue-covered side of the molded inner layer 620 at around the lower regions of the brassiere cup portions 610 and 615. Notably, the underwire assemblies 420 are placed such that the gel pads 400 face toward, not away from, the molded inner layer 620. Furthermore, each of the gel pads 400 reside within the shaved gel areas 305, 310, 315, and 320. The resulting assembly is a composite inner layer 720 comprising the underwire assemblies 420 and the molded inner layer 620. It should be appreciated that the location of the underwire assemblies 420 within the composite inner layer 720 corresponds with the lower contour region of the wearer's breasts. Thus, the resulting brassiere cups 105 and 110 (FIG. 1) will have the underwire assemblies 420 at their lower peripheral areas so as to provide support and lift to the wearer's breasts.

Figure 8:
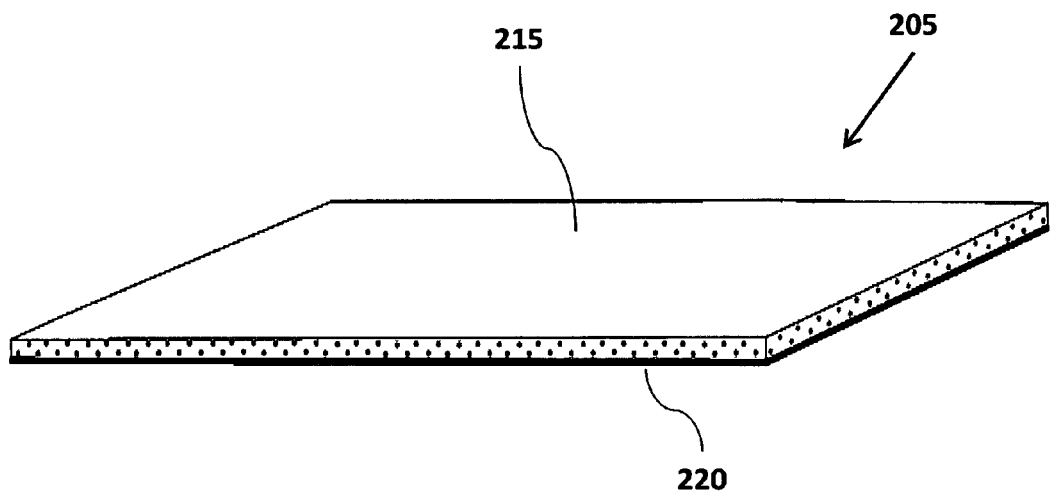
FIG. 8 is a perspective view of the outer layer comprising a glue-covered foam material layer according to an embodiment of the invention.

FIG. 8 illustrates the outer layer 205 with polyurethane foam material 215 in a substantially planar form and ready for molding. Glue is applied to the exposed side of the polyurethane foam material 215 of the outer layer 205, directly opposite the side of the fabric lining 220. Preferably, the glue is a solvent based glue and may be one or more of water-based glue, thermal plastic glue, TPU glue, PU glue, or the like.

Figure 9:
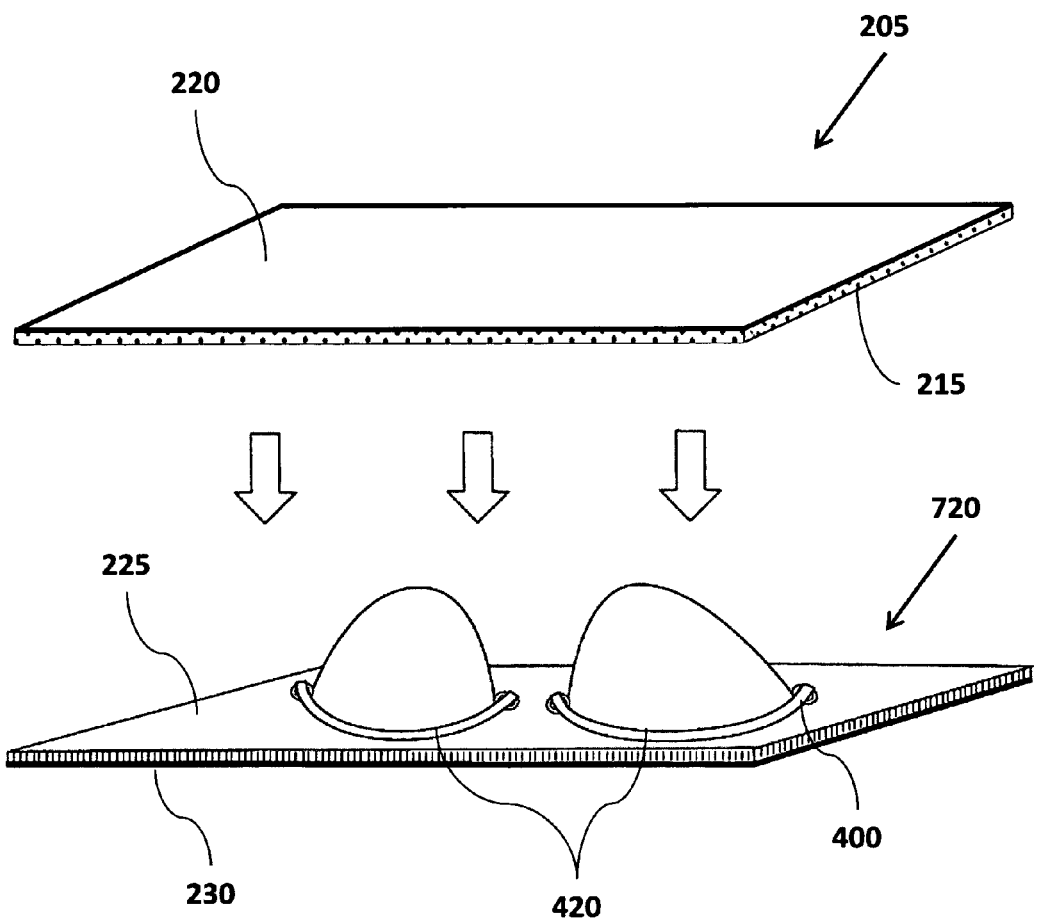
FIG. 9 is a perspective view of a second molding process of the composite inner layer shown in FIG. 7 with the outer layer according to an embodiment of the invention.

As shown in FIG. 9, the outer layer 205 is provided for molding with the composite inner layer 720 so as to completely encase the underwire assemblies 420 between the outer layer 205 and the composite inner layer 720. Notably, the outer layer 205 is positioned with respect to the composite inner layer 720 such that the glue-covered side 215 of the outer layer 205 (i.e., the side of the exposed polyurethane foam material) comes in contact with the glue covered side 225 of the composite inner layer 720 during this second molding process. However, it should be appreciated that one or more additional layer or a padding material may be placed between the composite inner layer 720 and the outer layer 205 without departing from the scope of the invention. It is contemplated that a stabilizer tricot (not shown) may be placed at the ends of the underwire assemblies 420 to hold the assemblies 420 in place during this second molding process. The outer layer 205 is molded together with the composite inner layer 720 to form a molded composite layer having brassiere cup portions 610 and 615.

The second molding press used to integrally mold the composite inner layer 720 and the outer layer 205 preferably comprises a first molding panel and a second molding panel (not shown). The two panels are preferably preheated at designated temperatures and comprise aluminum, but other suitable material known in the art may be used to make the panels of the second molding press. The first molding panel comes in contact with the fabric layer side 220 of the outer layer 205 and contains concave surfaces for forming brassiere cup portions 610 and 615. The second molding panel, having convex surfaces, comes in contact with the fabric layer side 230 of the composite inner layer 720. Additionally, the second molding panel preferably contains recessed areas. These recessed areas are necessary in order to accommodate the formed protrusions on the fabric lining side 230 of the composite inner layer 720. Notably, the shapes of the recessed areas correspond to the shapes of the protrusions formed during the first molding process. Thus, the recessed areas function to maintain the shapes of the protrusions on the fabric lining side 230 as the gel pads 400 are being pushed into the shaved gel areas 305, 310, 315, and 320. The gel tips 115, 120, 125, and 130 as shown in FIG. 1A all have tear-drop shapes, because the corresponding recessed areas of the second molding panel also had indented tear-drop shapes.

After the second molding process, the integrally molded composite layer comprising the outer layer 205 and the composite inner layer 720 is trimmed to remove the excess material and create brassiere cups 105 and 110. The cups 105 and 110 are preferably smooth with no apparent bumps visible on the front side 220. However, as illustrated in FIG. 1A, the back side of the brassiere cups 110 and 105 preferably bear protruded gel tips 115, 120, 125, and 130. Preferably, the bulk of the gel pad material 400 is present on the first side 430 of the arcuate wire 405, so that the wearer of the brassiere cups will have a maximum support from the gel tips by having more gel pad material 400 closer to her than on the opposing second side of the arcuate wire 405. The brassiere cup assembly according to the present invention may be further incorporated into brassiere products known in the art including undergarments, garments such as tank tops, camisoles, other conventional tops, dresses, leotards, sportswear, bathing suits, and the like. As such, the brassiere cup assembly may be attached to conventional brassiere components such as hooks, straps, fabric, or other auxiliary components to produce a final brassiere product.

Figure 10:
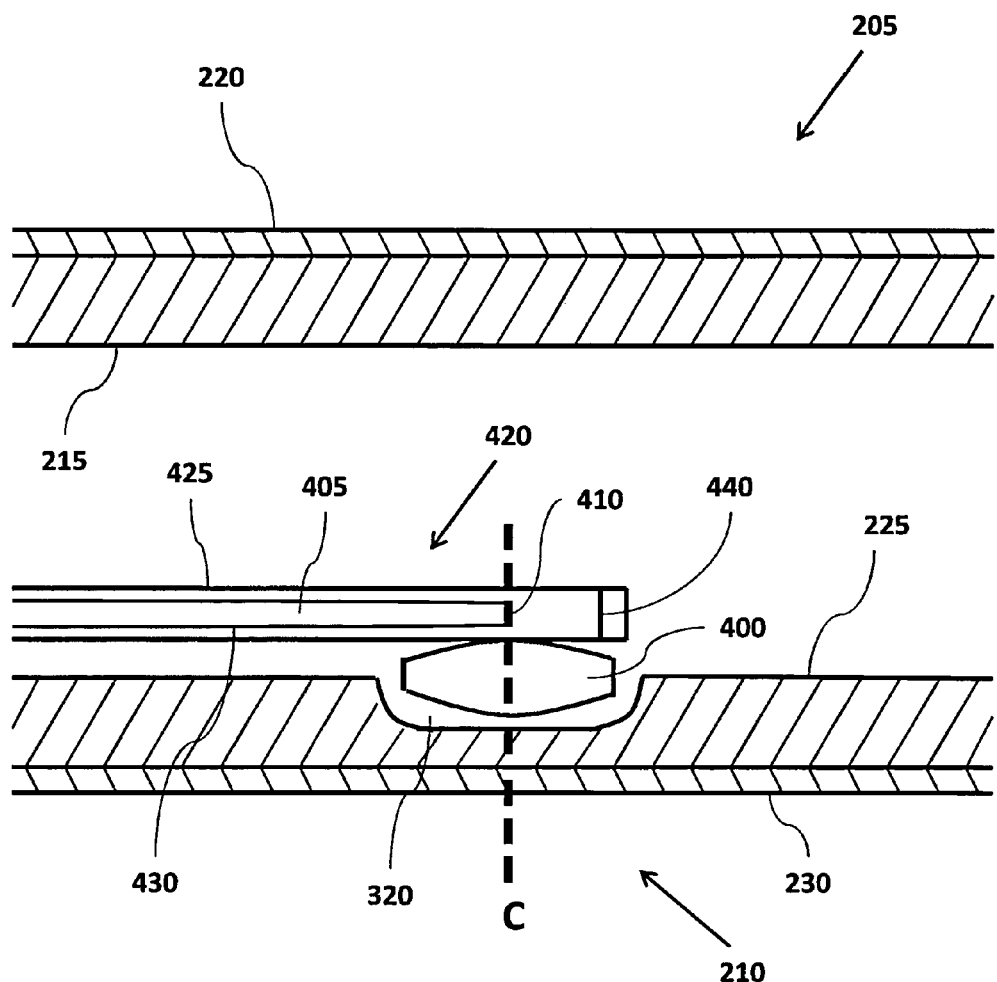
FIG. 10 is a cross-sectional view illustrating one of the shaved gel areas of the inner layer and a portion of the outer layer having the underwire assembly therebetween according to an embodiment of the invention.

A cross-sectional view of the shaved gel area 320 as shown in FIG. 10 provides a clear view of the configuration of various components in the area proximal to the shaved gel area 320. However, it should be appreciated that the configuration is also applicable to other shaved gel areas according to the present invention. According to a preferred embodiment of the invention, the wire casing 425 contains the arcuate wire 405, whose end 410 aligns approximately with center point C of the gel pad 400. The underwire assembly 420 rests on the polyurethane foam material side 225 of inner layer 210. More specifically, the underwire assembly is placed such that the gel pad 400 is housed within the shaved gel area 320. The polyurethane foam material 225 of inner layer 210 faces the polyurethane foam material 215 of the outer layer 205. This ensures that after the second molding process the brassiere cup portions 610 and 615, which correspond to brassiere cups 110 and 105, respectively, will have the back and front sides bearing fabric linings 230 and 220, respectively.

Referring to FIG. 11, there are shown alternate embodiments of the invention. Particularly, the gel tips according to the present invention, independently of one another, may be formed of various shapes. Examples of such shapes include, but are not limited to, a circle 1005, an oval 1010, a triangle 1015, a heart 1020, a small triangle 1025, a half-circle 1030, a half-oval 1035, a tear-drop 1040, and a small heart 1045. It should be appreciated that the shape of shaved gel areas as well as bulged and recessed areas of the molding panels may be modified to form the desired shapes for the gel tips. All other aspects of the invention may remain the same as the embodiment shown and described in FIGS. 1-9, without departing from the scope of the invention.

It should also be appreciated that other similar methods, components, and equipments may be utilized to manufacture the brassiere cup assembly without departing from the spirit of the present invention. While the present invention has been described with reference to the preferred embodiment and alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A brassiere underwire assembly comprising:
   an arcuate wire having an end;
   a wire casing covering at least the end of said arcuate wire; and
   at least one gel pad having, a center point, said gel pad being attached to, but not enclosing, said casing wherein the end of said arcuate wire is approximately aligned with said center point.

2. The brassiere underwire assembly of claim 1, wherein said at least one gel pad comprises at least one material selected from the group consisting of polyurethane gel, silicone gel, and a mixture thereof.

3. The brassiere underwire assembly of claim 1, wherein said wire casing has a first side and an opposing second side, wherein said first side faces said inner layer, and wherein said at least one gel pad is attached to said first side.

4. An underwire brassiere cup comprising:
   an underwire assembly comprising an arcuate wire having two opposing ends and at least one gel pad disposed on at least one opposing end of the arcuate wire;

an inner layer integrally joined to the underwire assembly such that the gel pad is substantially disposed between the inner layer and the arcuate wire; and an outer layer integrally joined to the inner layer and encasing said underwire assembly.

5. The underwire brassiere cup of claim 4, wherein said at least one gel pad has a center point, and wherein said at least one opposing end of said arcuate wire is approximately aligned with said center point.

6. The underwire brassiere cup of claim 4, wherein said inner layer further comprises at least one shaved gel area to accommodate said at least one gel pad.

7. The underwire brassiere cup of claim 6, wherein said shaved gel area comprises a diameter of about 15 mm.

8. The underwire brassiere cup of claim 6, wherein said shaved gel area comprises a depth of about 4 mm.

9. The underwire brassiere cup of claim 4, wherein said inner layer comprising an inner foam material; said outer layer comprising an outer foam material; and wherein said underwire assembly is contained between said inner foam material and said outer foam material.

10. The underwire brassiere cup of claim 9, wherein said inner layer is substantially laminated to an inner fabric lining and said outer layer is substantially laminated to an outer fabric lining.

11. The underwire brassiere cup of claim 4, wherein said at least one gel pad comprises at least one material selected from the group consisting of polyurethane gel, silicone gel, and a mixture thereof.

12. The underwire brassiere cup of claim 4, wherein said gel pad comprises a gel disc sandwiched between two polyurethane films.

13. The underwire brassiere cup of claim 4, wherein said inner layer is integrally molded to said outer layer.

14. The underwire brassiere underwire assembly of claim 4, wherein said arcuate wire has a first side and an opposing second side, wherein said first side faces said inner layer, and wherein said at least one gel pad is attached to said first side.

15. The underwire brassiere cup of claim 4, wherein said inner layer bears at least one protrusion corresponding to said at least one gel pad.

16. The underwire brassiere cup of claim 15, wherein at least one shape of said at least one protrusion is selected from the group consisting of a circle, an oval, a triangle, a heart, a half-circle, a half-oval, and a tear-drop.

17. An underwire brassiere cup comprising:
an underwire assembly comprising an arcuate wire and at least one gel pad; and
an inner layer integrally joined to an outer layer and encasing said underwire assembly, said inner layer having at least one shaved gel area to accommodate said at least one gel pad.

18. The brassiere cup of claim 17, wherein said at least one gel pad is coupled to an end of said arcuate wire.

19. The brassiere cup of claim 18, wherein said at least one gel pad has a center point, and wherein said end of said arcuate wire is approximately aligned with said center point.

20. The brassiere cup of claim 17, wherein said inner layer comprising an inner foam material; said outer layer comprising an outer foam material; and wherein said underwire assembly is contained between said inner foam material and said outer foam material.

21. The underwire brassiere cup of claim 20, wherein said inner layer is substantially laminated to an inner fabric lining and said outer layer is substantially laminated to an outer fabric lining.

22. The underwire brassiere cup of claim 17, wherein said at least one gel pad comprises at least one material selected from the group consisting of polyurethane gel, silicone gel, and a mixture thereof.

23. The underwire brassiere cup of claim 17, wherein said inner layer is integrally molded to said outer layer.

24. The underwire brassiere cup of claim 17, wherein said arcuate wire has a first side and an opposing second side, wherein said first side faces said inner layer, and wherein said at least one gel pad is attached substantially to said first side.

25. The underwire brassiere cup of claim 17, wherein said inner layer bears at least one protrusion corresponding to said at least one gel pad.

26. The underwire brassiere cup of claim 25, wherein at least one shape of said at least one protrusion is selected from the group consisting of a circle, an oval, a triangle, a heart, a half-circle, a half-oval, and a tear-drop.

27. An underwire brassiere cup comprising:
an underwire assembly comprising an arcuate wire and at least one gel pad, wherein said gel pad is disposed at a point of the arcuate wire creating pressure to a wearer;
an inner layer integrally joined to an outer layer and encasing said underwire assembly, said inner layer having a protrusion comprising said at least one gel pad, said protrusion in inner layer configured to provides a cushion to protect the wearer against the pressure created by said arcuate wire.

28. The underwire brassiere cup of claim 27, wherein said at least one gel pad comprises at least one material selected from the group consisting of polyurethane gel, silicone gel, and a mixture thereof.

29. The underwire brassiere cup of claim 27, wherein at least one shape of said at least one protrusion is selected from the group consisting of a circle, an oval, a triangle, a heart, a half-circle, a half-oval, and a tear-drop.

30. The underwire brassiere cup of claim 27, Wherein said inner layer is integrally molded to said outer layer.

31. The underwire brassiere underwire assembly of claim 27, wherein said arcuate wire has a first side and an opposing second side, wherein said first side faces said inner layer, and wherein said at least one gel pad is attached to said first side.

32. A method of manufacturing a brassiere cup having at least one gel tip comprising:
providing an inner layer and an outer layer;
providing an underwire assembly comprising at least one gel pad attached to, but not enclosing, an arcuate wire; and
molding said inner layer with said outer layer so as to limn an integrally molded composite brassiere cup, wherein said underwire assembly is contained between said inner layer and said outer layer.

33. A method according to claim 32, further comprising the step of:
applying glue to said inner layer and said outer layer.

34. A method according to claim 32, further comprising the step of:
attaching said at least one gel pad to an end of said arcuate wire.

35. A method according to claim 32, further comprising the steps of:
encasing said arcuate wire in a wire casing; and
attaching said at least one gel pad to said wire casing.

36. A method according, to claim 35, wherein said attaching step comprises a step of applying heat to said at least one gel pad.

37. A method according to claim 32, further comprising the steps of:

creating at least one shaved gel area in said inner layer;

placing said underwire assembly on said inner layer, wherein said at least one gel pad is housed in said at least one shaved gel area.

38. A method according to claim 32, further comprising the step of:

molding said inner layer to form a molded inner layer having at least one brassiere cup portion.

39. A method according to claim 32, further comprising the step of:

molding said inner layer to form a protrusion for accommodating said at least one gel pad.

40. A method according to claim 32, wherein at least one shape of said at least one gel tip is selected from the group consisting of a circle, an oval, a triangle, a heart, a triangle, a half-circle, a half-oval, and a tear-drop.

41. A method according to claim 32, further comprising the step of:

removing excess inner layer and outer layer material from the integrally molded composite brassiere cup.

* * * * *